United States Patent [19]

Klaassen

[11] Patent Number: 4,547,817
[45] Date of Patent: Oct. 15, 1985

[54] HIGH FREQUENCY MAGNETIC RECORDING METHOD

[75] Inventor: Klaas B. Klaassen, 'sGravenzande, Netherlands

[73] Assignee: International Business Machines Corporation, Armonk, N.Y.

[21] Appl. No.: 691,690

[22] Filed: Jan. 15, 1985

Related U.S. Application Data

[63] Continuation of Ser. No. 373,203, Apr. 29, 1982, abandoned.

[51] Int. Cl.[4] .......................... G11B 5/09; G11B 5/04; G11B 21/10
[52] U.S. Cl. ....................................... 360/29; 360/30; 360/77
[58] Field of Search .................... 360/27–30, 360/25, 55, 66, 39, 77, 131

[56] References Cited

U.S. PATENT DOCUMENTS

| | | | |
|---|---|---|---|
| 2,419,195 | 4/1947 | Begun | 360/29 |
| 3,084,224 | 4/1963 | Sanford | 360/30 |
| 3,482,033 | 12/1969 | Warren | 360/30 |
| 3,956,769 | 5/1976 | Beecroft et al. | 360/77 |
| 4,313,140 | 1/1982 | Keidl | 360/77 |
| 4,314,289 | 2/1982 | Haynes | 360/77 |
| 4,318,141 | 3/1982 | Haynes | 360/77 |
| 4,390,911 | 6/1983 | Klaassen | 360/77 |

*Primary Examiner*—Raymond F. Cardillo, Jr.
*Assistant Examiner*—Steven R. Garland
*Attorney, Agent, or Firm*—N. N. Kallman; Otto Schmid, Jr.

[57] ABSTRACT

A method for recording high frequency signals representing data with simultaneous readout of low frequency information, such as servo information prerecorded on a magnetic disk, comprises the step of modulating with the data a carrier signal having a repetition frequency displaced significantly from the baseband of the data. The nonlinearity of the recording channel converts the modulated signal spectrum into the low frequency baseband so that the data is magnetically recorded while the low frequency prerecorded information is read out.

10 Claims, 13 Drawing Figures

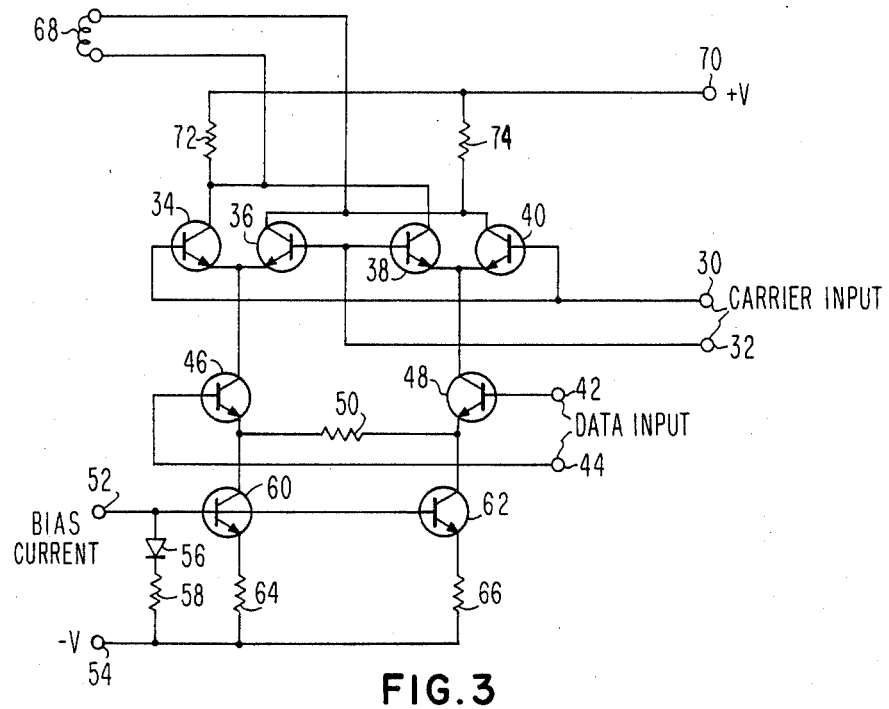
FIG.3
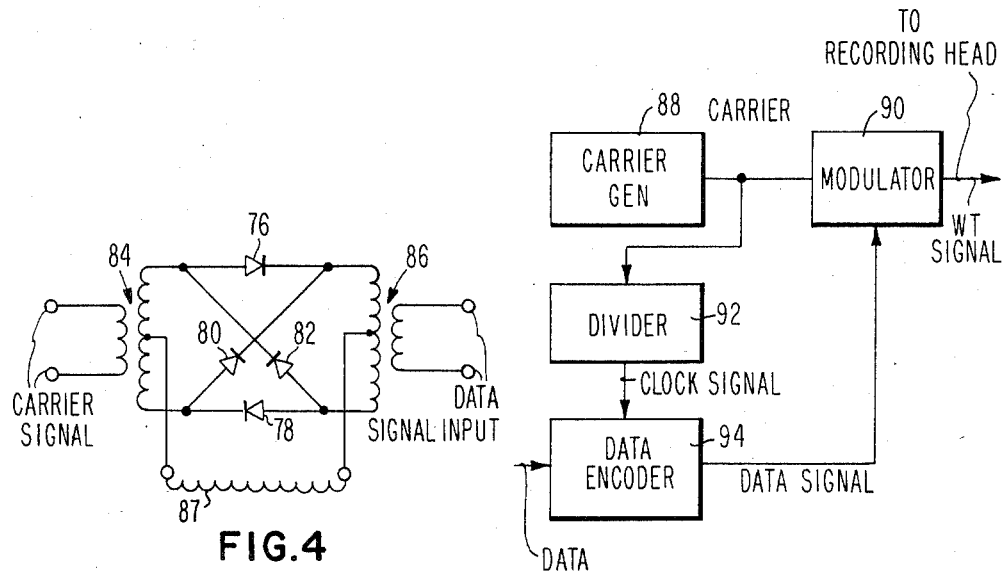
FIG.4
FIG.5

HIGH FREQUENCY MAGNETIC RECORDING METHOD

This is a continuation of application Ser. No. 06/373,203, filed Apr. 29, 1982, now abandoned.

DESCRIPTION

TECHNICAL FIELD

This invention relates to a method for recording high frequency signals representing data while reading out relatively low frequency information through a common magnetic head or closely spaced heads and a common recording channel.

BACKGROUND ART

Generally, prior art magnetic recording systems employ AC bias or saturated recording techniques. AC bias recording is used to improve the linearity of the recording channel, but reduces the high frequency response of the recording channel. Saturation recording can only record two magnetization levels and produces higher noise. In both methods, data signals are written in the baseband, i.e., the write signal contains a very high signal energy in the baseband. The baseband of a recording channel is defined as the range of frequencies or frequency band in which a sinusoidal write current will produce a non-zero readback signal when using DC or AC bias, or saturating or non-saturating recording.

In those prior art systems where stored information is being read out while new data is being written, such as in disk drives that have prerecorded servo signals in a buried layer of the magnetic disk that are being read out while write data signals are being registered on a separate layer of the disk, the frequencies of both the read servo signal and the newly recorded data signal are within the baseband frequency range. It is necessary, therefore, to separate the two signals by the use of critical filters on the write side and/or on the read side of the recording channel. Filtering causes an undesirable attenuation and phase distortion of the signals and other deleterious effects, besides adding to the cost, mass and volume of the processing system. Also, when AC bias is used for writing data, the phases of the respective bias and data signals result in a varying peak shift depending on the actual phase between the data pulses and bias signal zero crossings.

In prior art systems, the frequency of the write data signal is always in the baseband, as exemplified by FIG. 1A, representing a saturated recording method. An auxiliary input signal having a frequency above the baseband, such as an AC bias signal, may be used but not recorded in order to linearize the channel. The bias signal is a high frequency sinewave that is added to the baseband signal. This high frequency write signal cannot be stored in the magnetic medium because the thin magnetic recording media on the disk cannot sustain the short wavelength associated with this frequency; it is outside the baseband, as illustrated in FIG. 1B.

It would be desirable for instance for a head positioning servo system in a disk file to provide a magnetic recording system which operates without AC bias or saturated recording, and which obviates the need for complex and costly filters to separate the data signal from low frequency servo information.

CROSS REFERENCE TO OTHER PENDING PATENT APPLICATION

U.S. patent application Ser. No. 101,379, filed Dec. 7, 1979, now U.S. Pat. No. 4,313,140 entitled "Buried Control Signal Recording Systems and Method" and assigned to the same assignee, there is described a data recording system having a buried servo track wherein a single transducing gap of a magnetic head processes write data and recorded servo information. Signal separation is achieved with high pass filters, inter alia.

BRIEF DESCRIPTION OF THE DRAWINGS

The invention will be described in detail with reference to the drawing in which:

FIG. 3 is a schematic circuit diagram of a balanced modulator, such as may be used with the present invention;

FIG. 4 is a schematic circuit diagram of a ring modulator, which may be used as an alternative to the balanced modulator of FIG. 3;

FIG. 5 is a block diagram of a write signal generator circuit employed to implement the novel magnetic recording method of this invention;

DISCLOSURE OF THE INVENTION

Figure 1A:
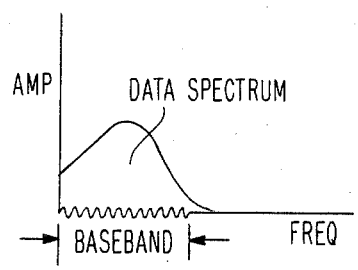
FIGS. 1A and 1B are plots of amplitude vs. frequency representing the write signal spectra for saturated recording and AC bias recording respectively, as practiced in the prior art.

With reference to FIG. 1A, the data frequency spectrum of a write current signal processed by saturation recording, as practiced in the prior art as illustrated. The write signal energy is concentrated within a low frequency spectrum or baseband B that is recordable on a magnetic medium, such as a magnetic disk. However, in systems such as magnetic disk files wherein servo signals are used for positioning of the magnetic head relative to recorded tracks, the frequency of the servo signals and the frequency of the data are both within the same data baseband spectrum so that it is necessary to employ critical filters for separating the signals during the write mode.

Figure 1B:
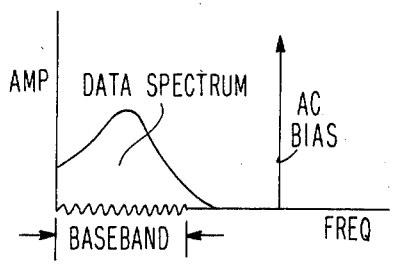

Another form of magnetic recording employs AC bias, as depicted in FIG. 1B. The frequencies of the write data signal are well below the frequency of the AC bias signal, and the data signal spectrum is within the baseband B. Again critical filters are required for processing data and servo signals concurrently in the recording channel.

Figure 1C:
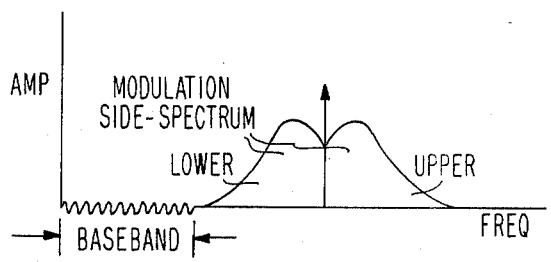
FIG. 1C is a plot of amplitude vs. frequency illustrating the frequency spectrum when a carrier is modulated with data, in accordance with this invention.

In accordance with this invention, and as illustrated in FIG. 1C, a carrier signal of fixed repetition frequency is modulated by a data signal to generate upper and/or lower sidebands. The carrier signal is a repetitive waveform whose fundamental frequency is a relatively high frequency and therefore the carrier is not recordable on a magnetic medium. For example, a carrier frequency of 100 MHz is used, and the carrier signal is modulated by a write data signal having a frequency in the range of 0.5 MHz to 6 MHz. The frequency of the servo signal is about 100 KHz, by way of example. This modulated signal forms the write current which flows through the coil of the recording head.

The demodulation of the modulated signal is accomplished in the nonlinear recording channel, which includes the magnetic head and the magnetic recording disk. Nonlinearity in the magnetic head is caused by partial saturation of its magnetic circuit that incorporates the Permalloy pole pieces of a thin film head, for example. Consequently, the magnetic field at the write gap of the head is not precisely proportional to the write current. Moreover, the magnetic circuit of the head can be designed so as to give a specific nonlinearity desirable for the demodulation.

Another source of nonlinearity in the recording channel is in the magnetization of the magnetic medium. Due to the hysteresis loops of the magnetic particles, the magnetic interaction of the adjacent particles and statistical variations in particle size, orientation and distribution, the remanent magnetization $M_r$ in the medium after writing with an external magnetic field produced by a current $I_w$ through a recording head is not proportional to that field. This is illustrated in FIGS. 1OA and 1OB.

Nonlinearity of the recording process results in a spectral conversion of the modulated out-of-band write current signal to a demodulated baseband remanent magnetization signal that is stored in the magnetic medium. The write current has a magnitude such that operation along the $M_r$-$I_w$ curve is below the saturation level in region X-Y shown in FIG. 1OB, with the average envelope amplitude of the write signal corresponding with the steepest portion of the channel characteristic.

Figure 2:
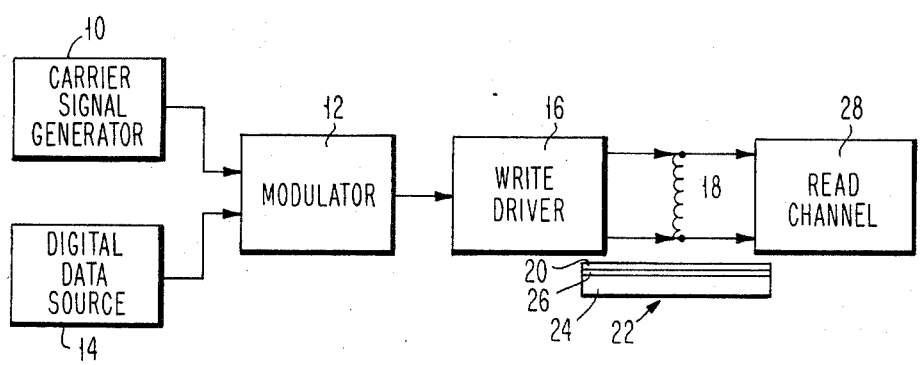
FIG. 2 is a schematic and block diagram of a system used to implement the inventive method of this application.
Figure 6:
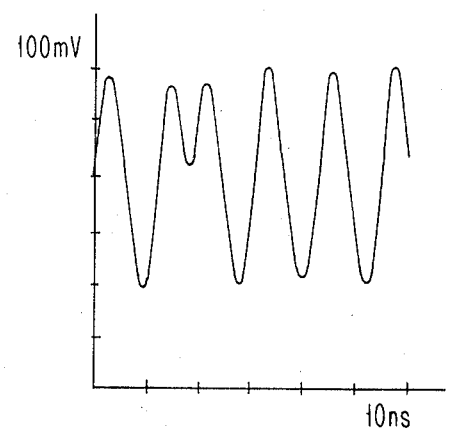
FIG. 6 is a waveform representing the write current, in expanded form, generated by modulation of a single sinewave carrier by a data signal transition in accordance with this invention.
Figure 7:
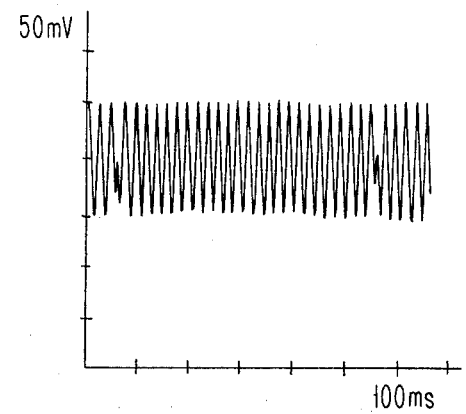
FIG. 7 is a waveform of a phase modulated carrier write current with two adjacent data signal transitions.
Figure 8:
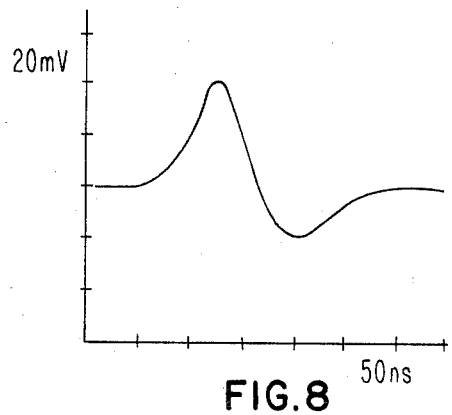
FIG. 8 is a waveform of a readback signal obtained from the write current, depicted in FIG. 6.
Figure 10A:
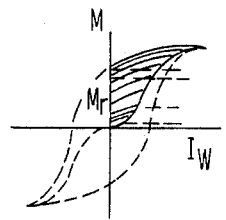
FIG. 10A is a typical magnetization curve wherein the magnetization M in the recording layer of the disk is plotted versus the write current $I_w$ through the coil of the recording head.
Figure 10B:
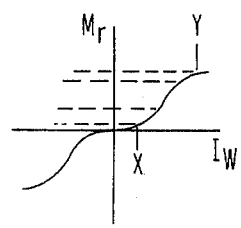
FIG. 10B indicates the resulting typical remanent magnetization $M_r$ of the magnetic recording layer versus the write current $I_w$. Here X-Y indicates the preferred zone of operation for the envelope amplitude of the modulated signal $I_w$, in accordance with this invention.

With reference to FIG. 2 depicting a preferred implementation of the invention, a sinewave carrier signal of fixed frequency produced by generator 10 is phase modulated in a modulator 12 by digital data signals derived from a data source 14. The data modulated carrier signal is then applied to a write driver 16 which generates a write current representing data signals. As the write current passes through the nonlinear channel that includes the write driver 16 and a magnetic head 18, preferably a thin film head, and a recording layer 20 of a magnetic disk 22, the data represented by the write current is converted to baseband remanent magnetization that is stored in the recording layer. The magnetic disk 22 includes a nonmagnetic substrate 24 and a buried servo layer 26 deposited on the substrate below the magnetic recording layer 20. A disk of this type is disclosed in U.S. Pat. No. 3,404,392.

Concurrent with the recordation of the data magnetization signal, the magnetic head 18 senses the prerecorded servo information in the buried layer 26 with the same transducing gap used for recording data or with a different transducing gap located in close proximity to the data recording gap. The low frequency servo information is passed to a read channel 28 for detection and further utilization, such as positioning the accessing head to a selected data track and following the circular track during the write mode.

With reference to FIG. 3, a balanced modulator circuit, such as may be used for the modulator 12 of FIG. 2, is illustrated. In operation, a carrier signal is applied across terminals 30, 32 that are connected respectively to the base electrodes of NPN complementary transistors 34, 36 and transistors 38, 40. Simultaneously, the data input signal is fed to terminals 42, 44 for application to the base electrodes of transistors 46, 48. The emitters of the transistors 46 and 48 are connected by a resistor 50. The common emitter circuit of transistors 46, 48 is coupled to a bias current 52 that is connected to a source of supply voltage 54 via diode 56 and resistor 58. The bias current is applied to the transistors 46 and 48 and the data channel through the current source transistors 60 and 62, which are also coupled to the supply voltage 54 by resistors 64 and 66 respectively.

The data and carrier signals are mixed in the circuit comprising transistors 34, 36, 38 and 40, and the data modulated carrier is directed from the output collector electrodes to a magnetic head 68 either directly or through a write driver 16 (see FIG. 2). The collector electrodes of output transistors 34, 36, 38 and 40 are tied to a positive potential 70 through resistors 72, 74. The data modulated signal to the magnetic head 68 provides a baseband remanent magnetization that is recorded as data on the top recording layer 20 of the magnetic disk 22.

As an alternative to the balanced modulator, a ring modulator as illustrated in FIG. 4 may be used. The ring modulator has four diode gates 76, 78, 80 and 82 connected across inductive elements of transformers 84 and 86. The carrier and data signals are supplied to the primary coils of the transformers 84 and 86 respectively, and the signals are mixed and suppressed by the diode array. The resultant modulated signal is applied to the magnetic head circuit 87 for recording, either directly or via a write driver.

In order to provide proper synchronization between the carrier and data signals, a high frequency write signal generation circuit, such as depicted in FIG. 5, is employed. A carrier signal generator 88 provides the carrier signal to a modulator 90. The carrier signal also is applied to a divider circuit 92 which produces a clock signal having a predetermined fixed phase difference with respect to the carrier, for instance, the same phase as the carrier. The clock signal is used for timing oUt the data signal which is applied from a data encoder 94 in conjunction with a carrier signal to the modulator for mixing the signals. The write signal output is then applied to a magnetic recording head, as described above.

Figure 9:
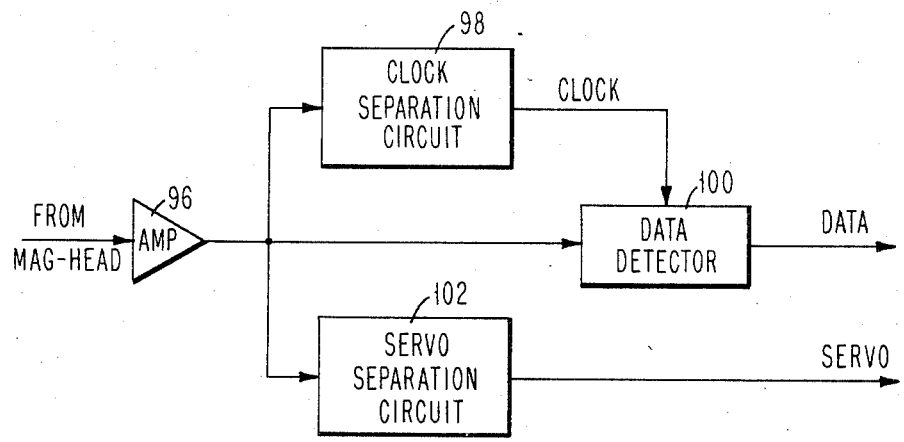
FIG. 9 is a block diagram of a read circuit for separating data and servo signals in the readout mode.

To obtain the data readback signal, the recorded data is sensed by the magnetic head and passed to an amplifier 96, as illustrated in the readback system of FIG. 9. The amplified readback signal is applied to a separation circuit 98 that separates the clock signal from the composite data and servo signal. Valid data synchronized by the clock is detected in the data detector 100. Simultaneously the low frequency servo signal that is sensed by the head is separated in the servo circuit 102, and the servo output is applied to a servo system that controls the position of the accessing magnetic head. In the write mode a noncritical low-pass filter located in front of amplifier 96 separates the low frequency servo signal from the high frequency write signal.

There has been described herein a novel method for recording high frequency signals representing data with simultaneous readout of low frequency information that includes the steps of modulating a carrier signal of very high frequency with a data signal, and processing the mixed signal through a nonlinear recording channel. The modulation may be achieved by phase modulation or amplitude modulation, by way of example. In this way, the low frequency information signal and data signal do not experience interference, thus precluding the need for critical high pass filters among other things.

I claim:

1. A method for magnetically recording a data signal on a magnetic medium with a magnetic head comprising the steps of:

providing a data signal to be recorded on a magnetic medium, said data signal having a frequency spectrum within a predetermined baseband;

generating a periodic carrier signal having a repetition frequency greater than the highest frequency of the baseband of the data signal;

modulating said carrier signal with said data signal to form a data modulated carrier signal having at least one sideband, wherein any sideband which is produced has a frequency spectrum higher than the highest frequency of the said baseband;

demodulating said data modulated carrier signal in a recording channel which includes said magnetic head and said magnetic medium in a nonlinear mode so that the demodulated resultant signal has components in the baseband of the data signal whereby said resultant signal components are recorded on a magnetic medium; and simultaneously reading out low frequency information with said baseband that has been prerecorded on said magnetic medium.

2. A method as in claim 1, wherein said low frequency information is a servo signal useful for positioning said magnetic head relative to said magnetic medium.

3. A method as in claim 2, wherein said carrier signal is generated as a fixed frequency of approximately 100 MHz, said data signal has a frequency range of approximately 0.5–6 MHz, and said servo signal has a frequency of approximately 100 KHz.

4. A method as in claim 2, wherein said data signal is stored in a first recording layer of said magnetic medium, and said servo information is stored in a second recording layer of said magnetic medium.

5. A method as in claim 1, wherein said recording of said resultant signal components and said readout of said low frequency information are achieved with a single transducing gap of said magnetic head.

6. A method as in claim 1, wherein said magnetic head is a thin film head that provides nonlinear recording operation.

7. A method as in claim 1, wherein said data signal modulates said carrier signal by phase modulation.

8. A method as in claim 1, wherein said data signal modulates said carrier signal by amplitude modulation.

9. A method as in claim 1, including the step of applying said data modulated carrier to a write driver for generating a write current representing the data signal through said magnetic head.

10. A method as in claim 1, wherein said recording of data resultant signal components and said readout of said low frequency information are achieved with two adjacent transducing gaps, one for recording data and one for reading the low frequency information.

* * * * *